(12) United States Patent
Lin et al.

(10) Patent No.: US 11,368,242 B2
(45) Date of Patent: Jun. 21, 2022

(54) INFORMATION TRANSMISSION METHOD AND DEVICE, AND COMPUTER STORAGE MEDIUM

(71) Applicant: GUANGDONG OPPO MOBILE TELECOMMUNICATIONS CORP., LTD., Dongguan (CN)

(72) Inventors: Yanan Lin, Dongguan (CN); Jia Shen, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/132,479

(22) Filed: Dec. 23, 2020

(65) Prior Publication Data

US 2021/0111830 A1 Apr. 15, 2021

Related U.S. Application Data

(63) Continuation of application No. PCT/CN2019/093508, filed on Jun. 28, 2019.

(30) Foreign Application Priority Data

Jun. 28, 2018 (CN) .......................... 201810686758.3

(51) Int. Cl.
*H04L 1/00* (2006.01)
*H04L 69/324* (2022.01)
*H04W 72/04* (2009.01)

(52) U.S. Cl.
CPC .......... *H04L 1/0009* (2013.01); *H04L 1/0002* (2013.01); *H04L 69/324* (2013.01); *H04W 72/0406* (2013.01)

(58) Field of Classification Search
CPC ... H04L 1/0009; H04L 1/0002; H04L 69/324; H04L 1/0061; H04L 1/0023; H04L 1/001;
(Continued)

(56) References Cited

U.S. PATENT DOCUMENTS

| 2006/0203772 A1 | 9/2006 | Laroia et al. |
| 2012/0207108 A1 | 8/2012 | Larsson et al. |

(Continued)

FOREIGN PATENT DOCUMENTS

| CN | 103684683 A | 3/2014 |
| EP | 3232594 A1 | 10/2017 |
| WO | WO2020001580 A1 | 1/2020 |

OTHER PUBLICATIONS

Catt, Considerations on UCI multiplexing for NR URLLC, 3GPP TSG RAN WG1 Meeting #93, R1-1806297, Busan, Korea, May 21-25, 2018, 2 pgs.
(Continued)

*Primary Examiner* — Hirdepal Singh
(74) *Attorney, Agent, or Firm* — Morgan, Lewis & Bockius LLP

(57) ABSTRACT

An information transmission method includes: receiving configuration information for a physical uplink control channel (PUCCH), wherein the configuration information is used for correspondingly configuring, for each PUCCH format, at least two maximum code rates (MCRs); receiving downlink control information (DCI), wherein the DCI includes indication information for indicating an MCR used by a target PUCCH; and determining, according to the indication information in the DCI, the MCR used by the target PUCCH from the at least two MCRs correspondingly configured for a format of the target PUCCH.

16 Claims, 3 Drawing Sheets

(58) Field of Classification Search
CPC ............ H04L 5/0053; H04W 72/0406; H04W 72/1226; H04W 72/1289; H04W 28/22; H04W 72/02
USPC .......................................................... 455/450
See application file for complete search history.

(56) References Cited

U.S. PATENT DOCUMENTS

| | | | | |
|---|---|---|---|---|
| 2018/0035323 | A1* | 2/2018 | Li .......................... | H04L 5/0057 |
| 2020/0296713 | A1* | 9/2020 | Matsumura ............ | H04W 72/04 |
| 2020/0337074 | A1* | 10/2020 | Papasakellariou .... | H04L 1/1671 |
| 2020/0389258 | A1* | 12/2020 | Lei ........................ | H04L 1/1685 |
| 2021/0058919 | A1* | 2/2021 | Takeda .................. | H04L 1/1854 |

OTHER PUBLICATIONS

Guangdong OPPO Mobile Telecommunications Corp. Ltd., Extended European Search Report, EP19827163.7, dated Jul. 12, 2021, 10 pgs.
Guangdong OPPO Mobile Telecommunications Corp. Ltd., International Search Report and Written Opinion, PCT/CN2019/093508, dated Sep. 16, 2019, 11 pgs.
Guangdong OPPO Mobile Telecommunications Corp. Ltd., Requisition by the Examiner, CA3105134, dated Jan. 4, 2022, 5 pgs.
Guangdong OPPO Mobile Telecommunications Corp. Ltd., Examination Report, IN202117003627, dated Jan. 7, 2022, 7 pgs.

* cited by examiner

INFORMATION TRANSMISSION METHOD AND DEVICE, AND COMPUTER STORAGE MEDIUM

CROSS-REFERENCE TO RELATED APPLICATION

This application is a continuation application of PCT Patent Application No. PCT/CN2019/093508, filed on Jun. 28, 2019, which claims priority to Chinese Patent Application No. 201810686758.3, filed with the State Intellectual Property Office of the People's Republic of China on Jun. 28, 2018, all of which are incorporated herein by reference in their entirety.

TECHNICAL FIELD

The embodiments of the present disclosure relate to the field of wireless communications technologies, and in particular, to a method and a device for information transmission, and a computer storage medium.

BACKGROUND

Code rate, also referred to as coding rate, refers to the proportion of the useful part (i.e., the non-redundant part) in the data stream. In the 5th generation (5G) new radio (NR) system, a variety of physical uplink control channel (PUCCH) formats are introduced, and the code rates of these PUCCH formats are configurable. In order to ensure the transmission reliability of the uplink control information (UCI) carried by the PUCCH, a maximum code rate (MCR is defined, which means the maximum code rate supported by UCI transmission. In the current related art, MCR can be determined based on the PUCCH format, that is, each PUCCH format defines an MCR independently. MCR limits the maximum code rate supported by uplink control information.

In addition, PUCCH resource can also be obtained based on MCR. In the actual application process, except for very few special cases (e.g., UCI payload exceeding the upper limit), MCR is the code rate used when UCI is actually transmitted.

Typically, MCR is configured statically or semi-statically through RRC signaling, which makes it difficult for the process of UCI transmission through PUCCH to adapt to channel changes. However, multiple services with different delay and reliability requirements have introduced in 5G-related technologies. Therefore, the current configuration for MCR cannot meet the requirements of the multiple services in 5G-related technologies.

SUMMARY

In view of above, the present application is mainly directed to provide a method and a device for information transmission, and a computer storage medium, which are able to dynamically adjust MCR of PUCCH, so as to meet different requirements of multiple channels and/or services.

In order to achieve the above purpose, the technical solution of the present application can be implemented as follows.

According to a first aspect of the embodiments of the present application, there is provided an information transmission method, including:

receiving configuration information with respect to PUCCH; wherein the configuration information is used for configuring at least two MCRs for each PUCCH;

receiving downlink control information (DCI); wherein the DCI includes indication information used for indicating an MCR used by a target PUCCH; and determining, according to the indication information in the DCI, the MCR used by the PUCCH from the at least two MCRs configured for the target PUCCH.

According to a second aspect of the embodiments of the present application, there is provided a user device, including: a first receiving part, a second receiving part and a determining part; wherein the first receiving part is configured to receive configuration information with respect to PUCCH; wherein the configuration information is used for configuring at least two MCRs for each PUCCH;

the second receiving part is configured to receive DCI; wherein the DCI includes indication information used for indicating an MCR used by a target PUCCH; and the determining part is configured to determine, according to the indication information in the DCI, the MCR used by the PUCCH from the at least two MCRs configured for the target PUCCH.

According to a third aspect of the embodiments of the present application, there is provided a user device, including: a network interface, a memory, and a processor; wherein, the network interface is configured to receive and send signals in a process of sending and receiving information with another external network element;

the memory is configured to store a computer program being able to be executed on the processor; and the processor, when executing the computer program, is configured to perform steps of the information transmission method according to the first aspect.

According to a fourth aspect of the embodiments of the present application, there is provided a computer storage medium storing an information transmission program, the data transmission program being executed by at least one processor to implement steps of the method according to the first aspect.

The embodiments of the present application provide a method, a device, and a computer storage medium for information transmission. Accordingly, at least two MCRs are configured for each PUCCH, so that the user device can adapt to multiple service requirements or channel qualities. In addition, the MCR used by the target PUCCH is indicated by the indication information in DCI, so that the MCR can be dynamically adjusted. Therefore, according to the technical solution provided by the embodiments of the present application, multiple service requirements or channel qualities can be adapted to, and changes between multiple service requirements or multiple channel qualities can be adapted to by dynamically adjusting the MCR.

DETAILED DESCRIPTION

The technical solutions in the embodiments of the present application will be described below in conjunction with the drawings according to the embodiments of the present application. The described embodiments are only part of the embodiments of the present application, rather than all of the embodiments. Based on the embodiments of this application, all other embodiments obtained by those of ordinary skill in the art without creative work shall fall within the protection scope of this application.

In order to understand the features and technical content of the embodiments of the present application in more detail, the implementation of the embodiments of the present disclosure will be described in detail below with reference to the accompanying drawings. The accompanying drawings are for reference and explanation purposes only, and are not used to limit the embodiments of the present disclosure.

The technical solutions of the embodiments of the present application can be applied to various communication systems, for example, global system of mobile communication (GSM) system, code division multiple access (CDMA) system, wideband code division multiple access (WCDMA) system, general packet radio service (GPRS), LTE system, LTE frequency division duplex (FDD) system, LTE time division duplex (TDD), universal mobile telecommunication system (UMTS), worldwide interoperability for microwave access (WiMAX) communication system, 5G system, and the like.

Figure 1:
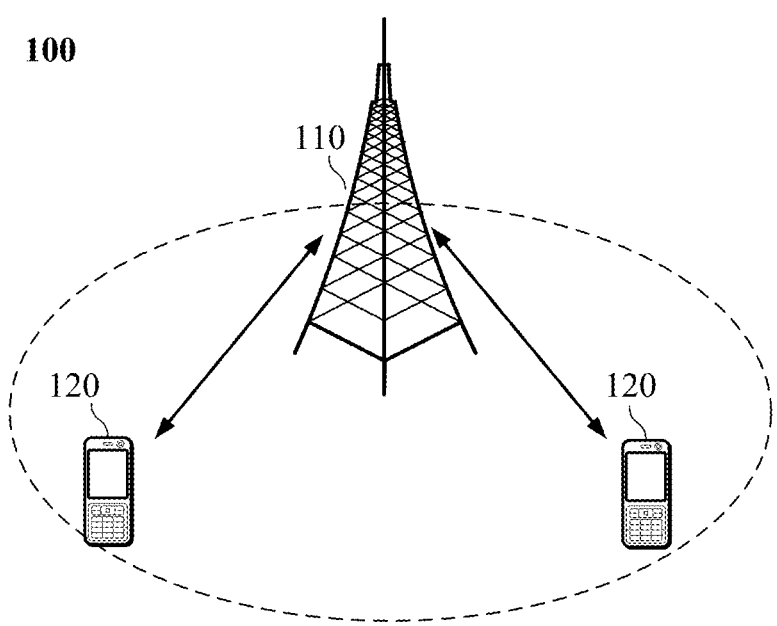
FIG. 1 is a schematic diagram illustrating a communication system architecture according to an embodiment of the present disclosure.

Exemplarily, the communication system 100 applied in the embodiments of the present application is shown in FIG. 1. The communication system 100 may include a network device 110, and the network device 110 may be a device that communicates with a terminal device 120 (or referred to as a communication terminal or a terminal). The network device 110 may provide communication coverage for a specific geographic area, and may communicate with terminal devices located in the coverage area. Optionally, the network device 110 may be a base transceiver station (BTS) in the GSM system or the CDMA system, or a NodeB (NB) in the WCDMA system, or an evolutional Node B (eNB or eNodeB) in the LTE system, or a radio controller in the cloud radio access network (CRAN). Alternatively, the network equipment may be a mobile switching center, a relay station, an access point, a vehicle-mounted device, a wearable device, a hub, a switch, a bridge, a router, a network side device in the 5G network, a network device in future evolutional public land mobile network (PLMN), or the like.

The communication system 100 further includes at least one terminal device 120 located within the coverage area of the network device 110. As used herein, the "terminal device" may be connected via, but is not limited to, wired lines, such as public switched telephone networks (PSTN), digital subscriber lines (DSL), digital cables, and direct cable; and/or another data connection/network; and/or via a wireless interface, such as cellular network, wireless local area network (WLAN), digital TV networks such as DVB-H networks, satellite networks, AM-FM broadcast transmitter; and/or an apparatus of another terminal device that is configured to receive/send communication signals; and/or Internet of things (IoT) equipment. A terminal device configured to communicate through a wireless interface may be referred to as a "wireless communication terminal", a "wireless terminal" or a "mobile terminal". Examples of mobile terminals include, but are not limited to, a satellite or cellular phone; a personal communications system (PCS) terminal that can combine a cellular radio phone with data processing, fax, and data communication capabilities; a PDA including a radio phone, a pager, an Internet/intranet access, a Web browser, a memo pad, a calendar, and/or a global positioning system (GPS) receiver; and a conventional laptop and/or palmtop receiver or other electronic devices including a radio telephone transceiver. The terminal device may refer to access terminal, user equipment (UE), user unit, user station, mobile station, mobile site, remote station, remote site, mobile equipment, user terminal, terminal, wireless communication equipment, user agent or user device. The access terminal may be a cellular phone, a cordless phone, a session initiation protocol (SIP) phone, a wireless local loop (WLL) station, a personal digital assistant (PDA), a handheld device with wireless communication functions, a computing device or other processing devices connected to wireless modems, an in-vehicle device, a wearable device, a terminal device in 5G network, a terminal device in the future evolutional PLMN, or the like.

Optionally, device to device (D2D) communication may be performed between the terminal devices 120.

Optionally, the 5G system or 5G network may also be referred to as NR system or NR network.

FIG. 1 exemplarily illustrates one network device and two terminal devices. Optionally, the communication system 100 may include multiple network devices and other numbers of terminal devices in the coverage of each network device, which are not limited in the embodiment.

Optionally, the communication system 100 may also include other network entities such as a network controller and a mobility management entity, which are not limited in the embodiment of the present application.

It should be understood that the devices with communication functions in the network/system in the embodiments of the present application may be referred to as communication devices. Taking the communication system 100 shown in FIG. 1 as an example, the communication device may include a network device 110 and a terminal device 120 having a communication function. The network device 110 and the terminal device 120 may be the specific device described above, which will not be repeated here. The communication device may also include other devices in the communication system 100, for example, other network entities such as the network controller and the mobility management entity, which are not limited in the embodiment of the present application.

It should be understood that the terms "system" and "network" in this disclosure may be used interchangeably. The term "and/or" in this disclosure only refers to an association relationship describing the associated objects, which means that there may be three relationships, for example, A and/or B may refer to three situations including A exists alone, A and B exist at the same time, and B exists alone. In addition, the character "/" in this disclosure generally indicates that the associated objects before and after are in an "or" relationship.

In the related art, the delay and reliability requirements of various services, or continuous changes in channel quality may cause a user device to adjust MCR used for transmission when transmitting uplink control information. For example, if the reliability of the service is high or the quality of the uplink transmission channel is poor, then in order to enable the receiving end to correctly receive the uplink information carried by the uplink transmission channel, a lower MCR may be used. That is, the proportion of the redundant part in the data stream is increased to ensure correct reception of the receiving end. Otherwise, if the service reliability requirements are low, or the quality of the uplink transmission channel is high, then a higher MCR may be used. That is, the ratio of non-redundant part in the data flow is increased to improve the demodulation efficiency of the receiving end.

In the 5G NR system, due to the introduction of ultra-reliable and low latency communication (URLLC) services, its latency and reliability requirements are very different from those of enhanced mobile broadband (eMBB) services. Accordingly, in the process of completing the above-mentioned services, the user device may need to be able to dynamically adjust the transmission code rate used in uplink transmission for adapting to changes in services or channels. Based on this, the following embodiments are proposed in the application.

Embodiment I

Figure 2:
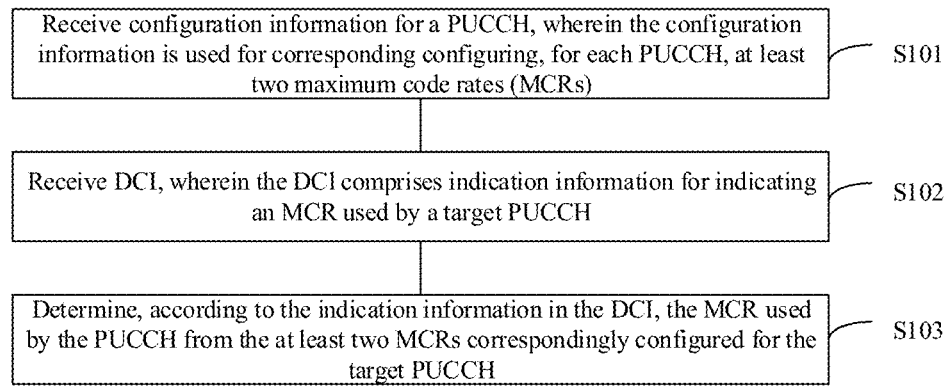
FIG. 2 is a schematic flowchart illustrating an information transmission method according to an embodiment of the present disclosure.

Referring to FIG. 2, it illustrates an information transmission method according to an embodiment of the present disclosure. The method can be applied to user equipment (UE) that needs to perform uplink transmission. The method may include following steps.

In step S101, configuration information with respect to physical uplink control channel (PUCCH) is received; wherein the configuration information is used for configuring at least two maximum code rates (MCRs) for each PUCCH;

In step S102, downlink control information (DCI) is received; wherein the DCI includes indication information used for indicating an MCR used by a target PUCCH;

In step S103, the MCR used by the PUCCH is determined from the at least two MCRs configured for the target PUCCH according to the indication information in the DCI.

Through the technical solution shown in FIG. 2, at least two MCRs are configured for each PUCCH, so that the user device can adapt to multiple service requirements or channel qualities. In addition, the MCR used by the target PUCCH is indicated by the indication information in DCI, so that the MCR can be dynamically adjusted. Therefore, according to the technical solution shown in FIG. 2, multiple service requirements or channel qualities can be adapted to, and changes between multiple service requirements or multiple channel qualities can be adapted to by dynamically adjusting the MCR.

It should be noted that, because MCR limits the maximum code rate supported by uplink control information, and is also the code rate used when actually transmitting uplink control information, MCR can be determined based on the PUCCH format, and PUCCH resource can also be obtained based on MCR. In view of this, according to the technical solution shown in FIG. 2, in a possible implementation manner, at least two MCRs are configured for each PUCCH. In an exemplary implementation process, at least two MCRs may be configured for each PUCCH format; or, at least two MCRs may be configured for each PUCCH resource set; or, at least two MCRs may be configured for each PUCCH resource. Therefore, the configuration information is used for configuring at least two MCRs for each PUCCH format.

Alternatively, the configuration information is used for configuring at least two MCRs for each PUCCH resource set.

Alternatively, the configuration information is used for configuring at least two MCRs for each PUCCH resource.

Understandably, at least two MCRs are correspondingly configured for each PUCCH through the foregoing implementation manner, so that each PUCCH can adapt to at least two service requirements or at least two channel qualities.

According to the technical solution shown in FIG. 2, at least two MCRs corresponding to each PUCCH may include following specific forms:

at least two independent absolute maximum bit rates;

or, at least one absolute MCR and at least one relative MCR based on the absolute MCR.

Understandably, if the at least two MCRs are at least two independent absolute MCRs, the UE may directly configure the PUCCH after receiving the configuration information. As to the relative MCR, the UE, after receiving the configuration information, may need to process according to the relative MCR and the absolute MCR, thereby increasing the processing workload of the UE, but reducing the signaling load of the configuration information.

After receiving the configuration information, the UE can acknowledge at least two candidate MCRs corresponding to each PUCCH. As to which MCR is specifically determined from the candidate MCRs to perform transmission of uplink control information, indication of the DCI is adopted according to embodiments of the present disclosure, and the specific indication may be expressed explicitly or implicitly through the indication information.

Based on this, in a first example, the indication information includes: an indicator carried in a field of the DCI; wherein the indicator is used for indicating the MCR used by the target PUCCH.

It should be noted that in the above-mentioned example, the indicator carried by DCI is used for indicating the MCR used by the target PUCCH, which can be considered as an explicit indication of the MCR used by the target PUCCH, and the implementation manner of the specific explicit indication can be either directly or indirectly. For example, if the indicator is used for directly indicating the MCR used by the target PUUCCH, the UE can parse the indicator and obtain the MCR used by the target PUCCH directly according to the indicator information, which may be considered as a direct explicit indication. If the indicator is used for indicating a PUCCH-related parameter corresponding to the MCR, for example, a PUCCH format, a PUCCH resource or a PUCCH service type corresponding to the MCR, the UE, after parsing the indicator, can obtain the MCR used by the target PUCCH based on a corresponding relationship between the PUCCH-related parameter represented by the indicator and the MCR. In such case, it can be considered as an indirect indication. Through the above examples, the MCR used by the target PUCCH is explicitly indicated, so that the UE can obtain the MCR used by the target PUCCH according to the indicator in the DCI, thus the MCR can be dynamically adjusted to adapt to change between multiple service requirements or multiple channel qualities.

In a second example, the indication information includes: a radio network temporary identification (RNTI) used for scrambling cyclic redundancy check (CRC) of the DCI; wherein there is a correspondence relationship between the RNTI and MCR.

It should be noted that in the second example, the MCR used by the target PUCCH is indicated by the RNTI used for the CRC scrambling of the DCI, which can be considered as an implicit indication of the MCR used by the target PUCCH. Compared with the first example, it can avoid adding additional fields to carry the indicator in the DCI signaling, thereby saving signaling overhead.

As to the second example, it should be noted that, since RNTI may include multiple types, such as service radio network controller (RNC) RNTI (i.e., S-RNTI), devolve RNC RNTI (i.e., D-RNTI)), cell RNTI (C-RNTI), UMTS terrestrial radio access network (UTRAN) RNTI (i.e., u-RNTI), downlink shared channel (DSCH) RNTI (i.e., DSCH-RNTI), and the like. Accordingly, taking two types of RNTIs as an example, corresponding to the indication information that implicitly indicate the MCR used by the target PUCCH, the determining, according to the indication information in the DCI, the MCR used by the PUCCH from the at least two MCRs configured for the target PUCCH may include:

descrambling the CRC of the DCI according to a first RNTI or a second RNTI;

determining, in response to successful descrambling of the CRC of the DCI according to the first RNTI, from the at least two MCRs configured for the target PUCCH that the MCR used by the PUCCH is a first MCR corresponding to the first RNTI; and determining, in response to successful descrambling of the CRC of the DCI according to the second RNTI, from the at least two MCRs configured for the target PUCCH that the MCR used by the PUCCH is a second MCR corresponding to the second RNTI; wherein, both the first MCR and the second MCR belong to the at least two MCRs configured for the target PUCCH.

In a specific implementation process, the first RNTI includes a cell radio network temporary identification (C-RNTI); the second RNTI includes a type of RNTI other than the C-RNTI.

In addition, in order to enable the UE to determine the MCR used by the target PUCCH based on the indication information, the corresponding relationship between the indication information and the MCR needs to be established for the UE in advance. Therefore, the method may further include: presetting a correspondence relationship between the indication information in the DCI and the MCR.

Through the presetting process, after receiving the DCI, the UE can determine the MCR used by the target PUCCH indicated by the indication information in the received DCI according to the corresponding relationship.

Specifically, the above-mentioned presetting process may include, after receiving the configuration information sent by the network device, the UE performs setting according to the related content in the configuration information. The configuration information may be carried in RRC signaling or system information; or may be preset according to the protocol, which is not limited in this embodiment.

Through the information transmission method provided in this embodiment, at least two MCRs are configured for each PUCCH, so that the UE can adapt to multiple service requirements or channel qualities. In addition, the MCR used by the target PUCCH is indicated by the indication information in DCI, so that the MCR can be dynamically adjusted. Therefore, according to the technical solution provided by the embodiments of the present application, multiple service requirements or channel qualities can be adapted to, and changes between multiple service requirements or multiple channel qualities can be adapted to by dynamically adjusting the MCR.

Embodiment II

Based on the same inventive concept as the foregoing embodiment, this embodiment uses multiple specific examples to illustrate the technical solutions of the foregoing embodiment.

Specific Example 1

In this specific example, the configuration information is used for configuring two MCRs for each PUCCH format. Firstly, the labels of the first MCRs configured, based on the configuration information, corresponding to PUCCH format 2, PUCCH format 3, and PUCCH format 4 are 1, 1, and 2, respectively. These first MCRs correspond to uplink feedback corresponding to the downlink scheduling scrambled by the first RNTI. The specific labels of the MCRs and the specific values thereof can be referred to Table 1, which will not be repeated later.

TABLE 1

| MCR Label | MCR Value |
| --- | --- |
| 0 | 0.08 |
| 1 | 0.15 |
| 2 | 0.25 |
| 3 | 0.35 |
| 4 | 0.45 |
| 5 | 0.60 |
| 6 | 0.80 |
| 7 | Reserved |

Secondly, the labels of the second MCRs configured, based on the configuration information, corresponding to PUCCH format 2, PUCCH format 3, and PUCCH format 4 are 3, 3, and 4, respectively. These second MCRs correspond to uplink feedback corresponding to the downlink scheduling scrambled by the second RNTI.

From the specific values of the first MCRs and the second MCRs, it can be seen that for the same PUCCH format, the specific value of the first MCR is lower than the specific value of the second MCR. In other words, when the downlink data is high-reliability data, or the uplink channel conditions are poor, in order to ensure the correct transmission and reception of data, the first MCR is to be configured. When the downlink data is data with low reliability requirements, or the uplink channel conditions are better, the second MCR can be configured.

Optionally, the first MCR in the configuration information may be the absolute label of the first MCR corresponding to each PUCCH format, and the configuration information with respect to the second MCR may be a deviation value based on the absolute label of the first MCR corresponding to each PUCCH format, that is, a relative value. In this specific example, the deviation value is set to 2. Therefore, after obtaining the label of the first MCR, the second MCR corresponding to each PUCCH format is obtained by adding the label of the first MCR corresponding to each PUCCH format to the deviation value, thereby obtaining the specific value of the second MCR corresponding to each PUCCH format by querying Table 1.

In addition, optionally, the first MCR in the configuration information may be the absolute label of the first MCR corresponding to each PUCCH format, and the second MCR may also be the absolute label of the second MCR corresponding to each PUCCH format. Therefore, the UE can directly query the specific value of the second MCR corresponding to each PUCCH format.

After configuring the first MCR and the second MCR for each PUCCH format, when the UE receives the downlink scheduling scrambled by the first RNTI, the first MCR is used for the uplink feedback corresponding to the downlink data; when the UE receives the downlink scheduling scrambled by the second RNTI, the second MCR is used for the uplink feedback corresponding to the downlink data.

Specific Example 2

In this specific example, the configuration information is used for configuring two MCRs for each PUCCH resource. Firstly, the labels of the first MCRs configured, based on the configuration information, corresponding to three PUCCH resources are 1, 1, and 2, respectively. These first MCRs correspond to uplink feedback corresponding to the downlink scheduling scrambled by the first RNTI. The specific labels of the MCRs and the specific values thereof can be referred to Table 1, which will not be repeated later.

Secondly, the labels of the second MCRs configured, based on the configuration information, corresponding to the forgoing three PUCCH resources are 3, 3, and 4, respectively. These second MCRs correspond to uplink feedback corresponding to the downlink scheduling scrambled by the second RNTI.

From the specific values of the first MCRs and the second MCRs, it can be seen that for the same PUCCH resource, the specific value of the first MCR is lower than the specific value of the second MCR. In other words, when the downlink data is high-reliability data, or the uplink channel conditions are poor, in order to ensure the correct transmission and reception of data, the first MCR is to be configured. When the downlink data is data with low reliability requirements, or the uplink channel conditions are better, the second MCR can be configured.

Optionally, the configuration information with respect to the second MCR may be a deviation value corresponding to each PUCCH resource. In this specific example, the deviation value is set to 2. Therefore, after obtaining the label of the first MCR, the second MCR corresponding to each PUCCH resource is obtained by adding the label of the first MCR corresponding to each PUCCH resource to the deviation value, thereby obtaining the specific value of the second MCR corresponding to each PUCCH resource by querying Table 1.

In addition, optionally, the configuration information with respect to the second MCR may be the label of the second MCR corresponding to each PUCCH resource, so that the UE can directly query the specific value of the second MCR corresponding to each PUCCH resource.

After configuring the first MCR and the second MCR for each PUCCH resource, when the UE receives the downlink scheduling scrambled by the first RNTI, the first MCR is used for the uplink feedback corresponding to the downlink data; when the UE receives the downlink scheduling scrambled by the second RNTI, the second MCR is used for the uplink feedback corresponding to the downlink data.

Embodiment III

Figure 3:
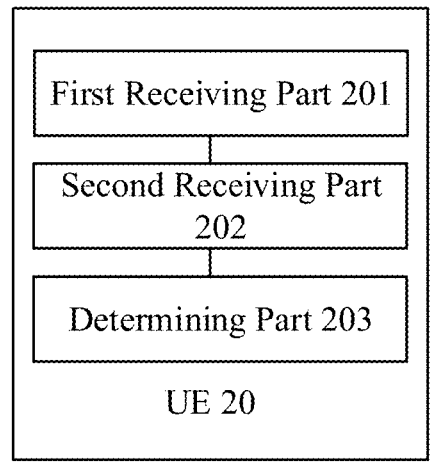
FIG. 3 is a schematic diagram illustrating a structure of the user device according to an embodiment of the present disclosure.

Based on the same inventive concept as the foregoing embodiment, referring to FIG. 3, it illustrates a composition of the UE 20 according to an embodiment of the present disclosure, which may include: a first receiving part 201, a second receiving part 202, and a determining part 203.

The first receiving part 201 is configured to receive configuration information with respect to PUCCH; wherein the configuration information is used for configuring at least two MCRs for each PUCCH.

The second receiving part 202 is configured to receive DCI; wherein the DCI includes indication information used for indicating an MCR used by a target PUCCH.

The determining part 203 is configured to determine, according to the indication information in the DCI, the MCR used by the PUCCH from the at least two MCRs configured for the target PUCCH.

In the above solution, the configuration information is used for configuring at least two MCRs for each PUCCH format; or the configuration information is used for configuring at least two MCRs for each PUCCH resource set; or the configuration information is used for configuring at least two MCRs for each PUCCH resource.

In the above solution, the at least two MCRs include:

at least two independent absolute maximum bit rates; or at least one absolute MCR and at least one relative MCR based on the absolute MCR.

In the above solution, the indication information includes: an indicator carried in a field of the DCI; wherein the indicator is used for indicating the MCR used by the target PUCCH.

In the above solution, the indication information includes: an RNTI used for scrambling CRC of the DCI; wherein there is a correspondence relationship between the RNTI and MCR.

In the above solution, the determining part 203 is configured to:

descramble the CRC of the DCI according to a first RNTI or a second RNTI;

determine, in response to successful descrambling of the CRC of the DCI according to the first RNTI, from the at least two MCRs configured for the target PUCCH that the MCR used by the PUCCH is a first MCR corresponding to the first RNTI;

determine, in response to successful descrambling of the CRC of the DCI according to the second RNTI, from the at least two MCRs configured for the target PUCCH that the MCR used by the PUCCH is a second MCR corresponding to the second RNTI; wherein, both the first MCR and the second MCR belong to the at least two MCRs configured for the target PUCCH.

In the above solution, the first RNTI includes a C-RNTI; and the second RNTI includes a type of RNTI other than the C-RNTI.

Figure 4:
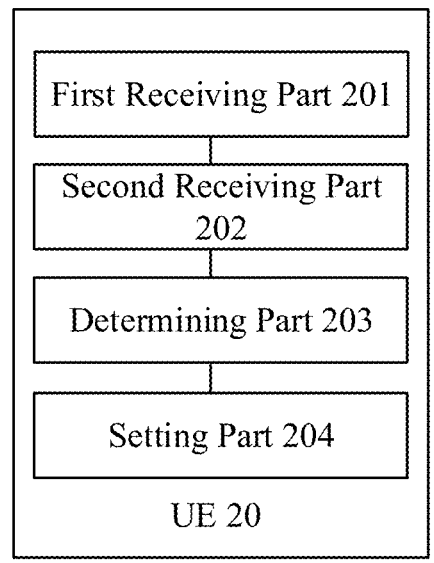
FIG. 4 is a schematic diagram illustrating a structure of the user device according to another embodiment of the present disclosure.

In the above solution, referring to FIG. 4, the UE 20 further includes a setting part 204 configured to preset a correspondence relationship between the indication information in the DCI and the MCR.

It is to be understood that in this embodiment, the "part" may be a part of a circuit, a part of a processor, a part of a program or software, and the like. Optionally, it may also be a unit or a module, or may be non-modularized.

In addition, the various components in this embodiment may be integrated into one processing unit, or each unit may exist alone physically, or two or more units may be integrated into one unit. The above-mentioned integrated unit can be realized in the form of hardware or software function module.

If the integrated unit is implemented in the form of a software function module and is not sold or used as an independent product, it can be stored in a computer readable storage medium. Based on this understanding, the essential technical solution of this embodiment or the part thereof that contributes to related art or all or part of the technical solution can be embodied in the form of a software product. The computer software product may be stored in a storage medium and includes several instructions to cause a computer device (which may be a personal computer, a server, a network device, or the like) or a processor to execute all or part of steps of the method described in this embodiment. The aforementioned storage medium may include U disk, mobile hard disk, read only memory (ROM), random access memory (RAM), magnetic disk, optical disk or other medium that can store program codes.

Therefore, this embodiment provides a computer storage medium, which may specifically be a computer-readable storage medium, and the computer storage medium stores an information transmission program, which, when being executed by at least one processor, is used for implementing the steps of the information transmission method described in the Embodiment I or Embodiment II.

Figure 5:
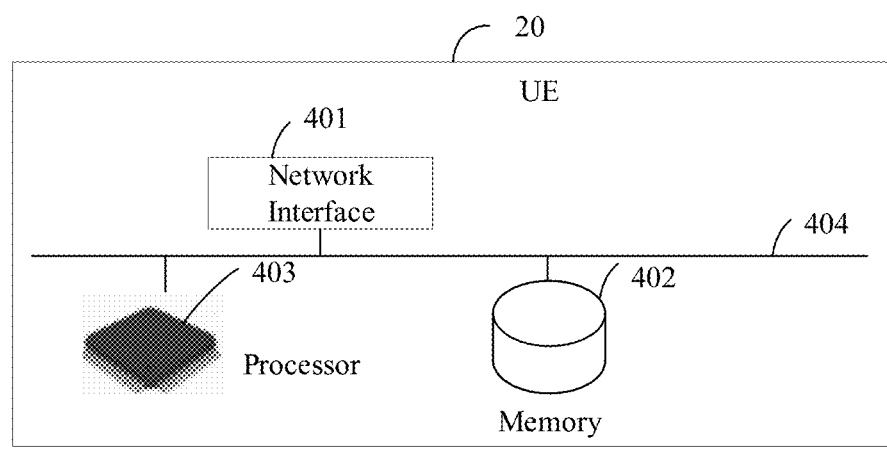
FIG. 5 is a schematic diagram illustrating a specific hardware structure of the user device according to an embodiment of the present disclosure.

Based on the above-mentioned UE 20 and computer storage medium, referring to FIG. 5, it illustrates a specific hardware structure of the UE 20 according to an embodiment of the present disclosure, including: a network interface 401, a memory 402, and a processor 403 that are coupled together via a bus system 404. It is to be understood that the bus system 404 is used for connection and communication between these components. In addition to the data bus, the bus system 404 may also include a power bus, a control bus, and a status signal bus. However, for brief description, various buses are marked as the bus system 404 in FIG. 5. In an embodiment, the network interface 401 is used for receiving and sending signals in the process of sending and receiving information with other external network elements.

The memory 402 is configured to store a computer program capable of running on the processor 403.

The processor 403, when running the computer program, is configured to perform:

receiving configuration information with respect to PUCCH; wherein the configuration information is used for configuring at least two MCRs for each PUCCH;

receiving DCI; wherein the DCI includes indication information used for indicating an MCR used by a target PUCCH; and determining, according to the indication information in the DCI, the MCR used by the PUCCH from the at least two MCRs configured for the target PUCCH.

It can be understood that the memory 402 in the embodiments of the present disclosure may be a transitory memory or a non-transitory memory, or may include both transitory and non-transitory memory. The non-transitory memory may be a read-only memory (ROM), a programmable read only memory (PROM), an erasable programmable read only memory (Erasable PROM, EPROM), an electric erase programmable read only memory (EEPROM) or a flash memory. The transitory memory may be a random access memory (RAM) serving as an external cache. By way of example without limitation, many forms of RAM are available, such as static random access memory (SRAM), dynamic random access memory (DRAM), synchronous dynamic random access memory (Synchronous DRAM, SDRAM), double data rate synchronous dynamic random access memory (DDRSDRAM), enhanced synchronous dynamic random access memory (ESDRAM), synchlink dynamic random access memory (SDRAM) and direct memory bus random access memory (DRRAM). The memory 402 in the systems and methods described herein is intended to include, without being limited to, these and any other suitable types of memory.

The processor 403 may be an integrated circuit chip with signal processing capability. In an implementation, each step of the foregoing methods may be completed by an integrated logic circuit of hardware in the processor 403 or an instruction in the form of software. The processor 403 may be a general-purpose processor, a digital signal processor (DSP), an application specific integrated circuit (ASIC), or a field programmable gate array (FPGA), or other programmable logic devices, discrete gates or transistor logic devices, discrete hardware components. The methods, steps, and logical block diagrams disclosed in the embodiments of the present disclosure may be implemented or carried out. The general purpose processor may be a microprocessor or any conventional processor or the like. The steps of the method disclosed in the embodiments of the present disclosure may be directly implemented by the hardware decoding processor, or may be performed by a combination of hardware and software modules in the decoding processor. The software module can be located in a conventional storage medium such as random access memory, flash memory, read only memory, programmable read only memory or electrically erasable programmable memory, registers, and the like. The storage medium is located in the memory 402, and the processor 403 reads the information in the memory 402 and completes the steps of the above method in combination with the hardware thereof.

It may be understood that the embodiments described herein can be implemented in hardware, software, firmware, middleware, microcode, or a combination thereof. For a hardware implementation, the processing unit can be implemented in one or more of application specific integrated circuit (ASIC), digital signal processing (DSP), digital signal processing device (DSPD), programmable logic device (PLD), field programmable gate array (FPGA), general purpose processor, controller, microcontroller, microprocessor, other electronic units or a combination thereof for performing the functions described herein.

For a software implementation, the techniques described herein can be implemented by modules (e.g., procedures, functions, and the like) that perform the functions described herein. The software code can be stored in memory and executed by the processor. The memory can be implemented in the processor or external to the processor.

Specifically, the processor 403 in the UE 20, when running the computer program, is further configured to perform the method steps described in the foregoing Embodiment I or Embodiment II, and details are not repeated herein.

It should be noted that the technical solutions described in the embodiments of the present disclosure can be combined arbitrarily without conflict.

The above are only the preferred embodiments of the present disclosure, and are not used to limit the protection scope of the present disclosure.

What is claimed is:

1. An information transmission method, comprising:
receiving configuration information with respect to physical uplink control channel (PUCCH), wherein the configuration information is used for configuring at least two maximum code rates (MCRs) for each PUCCH format;
receiving downlink control information (DCI), wherein the DCI includes indication information used for indicating an MCR used by a target PUCCH; and determining, according to the indication information in the DCI, the MCR used by the target PUCCH from the at least two MCRs configured for a format of the target PUCCH, wherein the method further comprises: presetting a correspondence relationship between the indication information in the DCI and the MCR.

2. The method according to claim 1, wherein the at least two MCRs comprise:
   at least two independent absolute maximum bit rates; or
   at least one absolute MCR and at least one relative MCR based on the absolute MCR.

3. The method according to claim 1, wherein the indication information comprises: an indicator carried in a field of the DCI; wherein the indicator is used for indicating the MCR used by the target PUCCH.

4. The method according to claim 1, wherein the indication information comprises: a radio network temporary identification (RNTI) used for scrambling cyclic redundancy check (CRC) of the DCI; wherein there is a correspondence relationship between the RNTI and MCR.

5. The method according to claim 4, wherein determining, according to the indication information in the DCI, the MCR used by the target PUCCH from the at least two MCRs configured for the format of the target PUCCH comprises:
   descrambling the CRC of the DCI according to a first RNTI or a second RNTI;
   determining, in response to successful descrambling of the CRC of the DCI according to the first RNTI, from the at least two MCRs configured for the format of the target PUCCH that the MCR used by the target PUCCH is a first MCR corresponding to the first RNTI;
   determining, in response to successful descrambling of the CRC of the DCI according to the second RNTI, from the at least two MCRs configured for the format of the target PUCCH that the MCR used by the target PUCCH is a second MCR corresponding to the second RNTI; wherein, both the first MCR and the second MCR belong to the at least two MCRs configured for the format of the target PUCCH.

6. A user device, comprising: a network interface and a processor; wherein
   the network interface is configured to receive configuration information with respect to physical uplink control channel (PUCCH), wherein the configuration information is used for configuring at least two maximum code rates (MCRs) for each PUCCH format; and receive downlink control information (DCI), wherein the DCI includes indication information used for indicating an MCR used by a target PUCCH; and
   the processor is configured to determine, according to the indication information in the DCI, the MCR used by the target PUCCH from the at least two MCRs configured for a format of the target PUCCH,
   wherein the processor is further configured to preset a correspondence relationship between the indication information in the DCI and the MCR.

7. The user device according to claim 6, wherein the at least two MCRs comprise:
   at least two independent absolute maximum bit rates; or
   at least one absolute MCR and at least one relative MCR based on the absolute MCR.

8. The user device according to claim 6, wherein the indication information comprises: an indicator carried in a field of the DCI; wherein the indicator is used for indicating the MCR used by the target PUCCH.

9. An information transmission method, comprising:
   sending, to a user device, configuration information with respect to physical uplink control channel (PUCCH), wherein the configuration information is used for configuring at least two maximum code rates (MCRs) for each PUCCH format; and
   sending, to the user device, downlink control information (DCI), wherein the DCI includes indication information used for indicating an MCR used by a target PUCCH, and the indication information is used for the user device to determine the MCR used by the target PUCCH from the at least two MCRs configured for a format of the target PUCCH,
   wherein the method further comprises: presetting a correspondence relationship between the indication information in the DCI and the MCR.

10. The method according to claim 9, wherein the at least two MCRs comprise:
    at least two independent absolute maximum bit rates; or
    at least one absolute MCR and at least one relative MCR based on the absolute MCR.

11. The method according to claim 9, wherein the indication information comprises: an indicator carried in a field of the DCI; wherein the indicator is used for indicating the MCR used by the target PUCCH.

12. The method according to claim 9, wherein the indication information comprises: a radio network temporary identification (RNTI) used for scrambling cyclic redundancy check (CRC) of the DCI; wherein there is a correspondence relationship between the RNTI and MCR.

13. The method according to claim 12, wherein the indication information is further used for the user device to:
    descramble the CRC of the DCI according to a first RNTI or a second RNTI;
    determine, in response to successful descrambling of the CRC of the DCI according to the first RNTI, from the at least two MCRs configured for the format of the target PUCCH that the MCR used by the target PUCCH is a first MCR corresponding to the first RNTI;
    determine, in response to successful descrambling of the CRC of the DCI according to the second RNTI, from the at least two MCRs configured for the format of the target PUCCH that the MCR used by the target PUCCH is a second MCR corresponding to the second RNTI; wherein, both the first MCR and the second MCR belong to the at least two MCRs configured for the format of the target PUCCH.

14. A network device, comprising: a network interface and a processor; wherein the network interface is, under control of the processor, configured to:
    send, to a user device, configuration information with respect to physical uplink control channel (PUCCH), wherein the configuration information is used for configuring at least two maximum code rates (MCRs) for each PUCCH format; and
    send, to the user device, downlink control information (DCI), wherein the DCI includes indication information used for indicating an MCR used by a target PUCCH, and the indication information is used for the user device to determine the MCR used by the target PUCCH from the at least two MCRs configured for a format of the target PUCCH,
    wherein the processor is further configured to preset a correspondence relationship between the indication information in the DCI and the MCR.

15. The network device according to claim 14, wherein the at least two MCRs comprise:
   at least two independent absolute maximum bit rates; or
   at least one absolute MCR and at least one relative MCR based on the absolute MCR.

16. The network device according to claim 14, wherein the indication information comprises: an indicator carried in a field of the DCI; wherein the indicator is used for indicating the MCR used by the target PUCCH.

* * * * *